(12) United States Patent
Hofmeister et al.

(10) Patent No.: US 11,843,243 B2
(45) Date of Patent: Dec. 12, 2023

(54) WIRELESS SENSOR NETWORK GATEWAY WITH INTEGRAL INTRINSIC SAFETY OUTPUTS FOR FIELD MOUNTED ACCESS POINT ANTENNAS

(71) Applicant: Rosemount Inc., Shakopee, MN (US)

(72) Inventors: Scott T. Hofmeister, Chaska, MN (US); Cody J. Skow, Shakopee, MN (US); Allen J. Kempke, Minneapolis, MN (US); Nicholas A. Wienhold, Waconia, MN (US); Theodore H. Schnaare, Carver, MN (US)

(73) Assignee: ROSEMOUNT INC., Shakopee, MN (US)

( * ) Notice: Subject to any disclaimer, the term of this patent is extended or adjusted under 35 U.S.C. 154(b) by 272 days.

(21) Appl. No.: 17/152,205

(22) Filed: Jan. 19, 2021

(65) Prior Publication Data
US 2021/0227630 A1 Jul. 22, 2021

Related U.S. Application Data

(60) Provisional application No. 62/963,344, filed on Jan. 20, 2020.

(51) Int. Cl.
*H01C 7/12* (2006.01)
*H02H 1/00* (2006.01)
(Continued)

(52) U.S. Cl.
CPC ........... *H02H 9/008* (2013.01); *H04B 10/802* (2013.01); *H04L 12/10* (2013.01); *H04W 88/16* (2013.01); *H04W 84/18* (2013.01)

(58) Field of Classification Search
CPC ...... H02H 9/008; H04B 10/802; H04L 12/10; H04W 88/16; H04W 88/18; H04W 84/18
(Continued)

(56) References Cited

U.S. PATENT DOCUMENTS 5,158,464 A 10/1992 Landrini
6,397,322 B1 5/2002 Voss
(Continued)

FOREIGN PATENT DOCUMENTS

| CN | 208707970 U | 4/2019 |
| JP | 55-33293 | 3/1980 |
| JP | 2010-541099 | 12/2010 |

OTHER PUBLICATIONS

Notification of Transmittal of the International Search Report and the Written Opinion of the International Searching Authority from PCT/US2021/014084, dated May 3, 2021.
(Continued)

*Primary Examiner* — Jared Fureman
*Assistant Examiner* — Lucy M Thomas
(74) *Attorney, Agent, or Firm* — Westman, Champlin & Koehler, P.A.

(57) ABSTRACT

A wireless sensor network gateway includes safe side circuitry, hazardous side circuitry and isolation circuitry, which are supported by a housing. The safe side circuitry includes a safe side power circuit, and a safe side data input/output (I/O) circuit. The hazardous side circuitry includes a hazardous side power circuit, and a hazardous side data I/O circuit. The isolation circuitry divides the safe side circuitry from the hazardous side circuitry. The isolation circuitry includes a power isolation circuit that couples the safe side power circuit to the hazardous side power circuit and forms an intrinsic safety barrier between the safe side power circuit and the hazardous side power circuit, and a data isolation circuit that couples the safe side data I/O circuit to the hazardous side data I/O circuit and forms an intrinsic safety barrier between the safe side data I/O circuit and the hazardous side data I/O circuit.

20 Claims, 8 Drawing Sheets

(51) Int. Cl.
  *H02H 1/04* (2006.01)
  *H02H 3/22* (2006.01)
  *H02H 9/06* (2006.01)
  *H02H 9/00* (2006.01)
  *H04W 88/16* (2009.01)
  *H04B 10/80* (2013.01)
  *H04L 12/10* (2006.01)
  *H04W 84/18* (2009.01)

(58) Field of Classification Search
  USPC ........................................................ 361/119
  See application file for complete search history.

(56) References Cited

U.S. PATENT DOCUMENTS

| | | | |
|---|---|---|---|
| 8,160,535 B2 | 4/2012 | Kielb et al. | |
| 8,885,559 B2* | 11/2014 | Schmidt | H04W 24/04 370/406 |
| 9,544,965 B1* | 1/2017 | O'Neil | H05B 45/10 |
| 2003/0123263 A1* | 7/2003 | Gottshall | H04L 12/40045 363/16 |
| 2008/0074309 A1* | 3/2008 | Nilsson | G01S 7/003 342/124 |
| 2008/0280568 A1* | 11/2008 | Kielb | G01D 21/00 340/12.3 |
| 2009/0252032 A1* | 10/2009 | Jiang | H04L 45/22 370/217 |
| 2011/0286386 A1* | 11/2011 | Kellam | H04W 28/06 370/328 |
| 2016/0072278 A1 | 3/2016 | Kollmer et al. | |
| 2016/0356474 A1 | 12/2016 | Jayawardena | |
| 2018/0348041 A1 | 12/2018 | Nilsson et al. | |
| 2019/0123548 A1 | 4/2019 | Kn et al. | |

OTHER PUBLICATIONS

Communication pursuant to Rules 161(1) and 162 EPC dated Aug. 4, 2022, for corresponding European Application No. 21705053.3, 3 pages.

Indian Examination Report dated Oct. 13, 2022, for corresponding Indian Application No. 202227039216, 5 pages.

Examination Report No. 1 from Australian Patent Application No. 2021211411, dated Mar. 10, 2023.

Office Action from Canadian Patent Application No. 3,165,059, dated Aug. 24, 2023.

Office Action from Japanse Patent Application No. 2022-544206, dated Aug. 29, 2023.

* cited by examiner

WIRELESS SENSOR NETWORK GATEWAY WITH INTEGRAL INTRINSIC SAFETY OUTPUTS FOR FIELD MOUNTED ACCESS POINT ANTENNAS

CROSS-REFERENCE TO RELATED APPLICATION

The present application is based on and claims the benefit of U.S. provisional patent application Ser. No. 62/963,344, filed Jan. 20, 2020, the content of which is hereby incorporated by reference in its entirety.

FIELD

Embodiments of the present disclosure are generally directed to a wireless sensor network gateway for powering and communicating with one or more access point smart antennas for wireless sensors located in a hazardous environment.

BACKGROUND

Industrial process field devices are used in industrial process control and monitoring systems to monitor industrial process variables using process sensors (e.g., pressure sensor, temperature sensor, etc.) and/or control one or more control devices (e.g., actuators, valves, etc.) that interact with an industrial process.

Frequently, the industrial process being controlled or monitored is located in a hazardous environment, such as one having an atmosphere that has flammable gases or vapors, flammable liquids, combustible dusts, ignitable fibers, etc., where there is always a risk that a fire or an explosion may occur. According to the industry accepted practice for classifying hazardous environments, an environment that has or may likely have ignitable concentrations of flammable gases or vapors under conditions of normal operation are designated as Zone 0, Zone 1 or Division 1 areas, while an environment where ignitable concentrations of flammable gases or vapors are likely to occur only under abnormal conditions are designated as a Zone 2 or Division 2 area. Environments where combustible or flammable materials are not present are typically referred to as non-hazardous or safe areas.

Field devices that are to be located in a hazardous environment must generally be constructed to be explosion protected using recognized techniques such as "intrinsic safety". An intrinsically safe device prevents ignition of flammable gases by limiting the amount of energy present in the electronics and by ensuring that electronic components are spaced far enough apart to prevent arcing in the event of an electrical fault. The heat generated by electronic components is also controlled. Requirements for equipment to be used in Zone 2 or Division 2 hazardous environments are less onerous since flammable or combustible materials are present in ignitable concentrations only under abnormal conditions.

SUMMARY

Embodiments of the present disclosure are directed to wireless sensor network gateways that are configured to be located in a non-hazardous environment and to supply power and communicate data with one or more antennas of a wireless sensor network located in a hazardous environment. In one embodiment, the gateway includes safe side circuitry, hazardous side circuitry and isolation circuitry. The safe side circuitry includes a safe side power circuit configured to receive power from a non-intrinsically safe power source, and a safe side data input/output (I/O) circuit configured to communicate data with non-intrinsically safe equipment. The hazardous side circuitry includes a hazardous side power circuit configured to deliver power to the antenna, and a hazardous side data I/O circuit configured to pass data signals to and from the antenna. The isolation circuitry divides the safe side circuitry from the hazardous side circuitry. The isolation circuitry includes a power isolation circuit that couples the safe side power circuit to the hazardous side power circuit and forms an intrinsic safety barrier between the safe side power circuit and the hazardous side power circuit, and a data isolation circuit that couples the safe side data I/O circuit to the hazardous side data I/O circuit and forms an intrinsic safety barrier between the safe side data I/O circuit and the hazardous side data I/O circuit. A housing of the gateway supports the safe side circuitry, the hazardous side circuitry, and the isolation circuitry.

Another embodiment of the gateway is configured to supply power and communicate data with a plurality of antennas of a wireless sensor network located in a hazardous environment. The gateway includes safe side circuitry, hazardous side circuitry and isolation circuitry. The safe side circuitry includes a safe side power circuit configured to receive power from a non-intrinsically safe power source, and a plurality of safe side data input/output (I/O) circuits, each configured to communicate data with non-intrinsically safe equipment. The hazardous side circuitry includes a hazardous side power circuit configured to deliver power to the plurality of antennas, and a plurality of hazardous side data I/O circuits, each configured to pass data signals to and from one of the plurality of antennas. The isolation circuitry divides the safe side circuitry from the hazardous side circuitry. The isolation circuitry includes a power isolation circuit that couples the safe side power circuit to the hazardous side power circuit and forms an intrinsic safety barrier between the safe side power circuit and the hazardous side power circuit, and a plurality of data isolation circuits, each coupling one of the plurality of safe side data I/O circuits to a corresponding one of the plurality of hazardous side data I/O circuits, and forming an intrinsic safety barrier between the plurality of safe side data I/O circuits and the corresponding plurality of hazardous side data I/O circuits. A housing of the gateway supports the safe side circuitry, the hazardous side circuitry, and the isolation circuitry.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
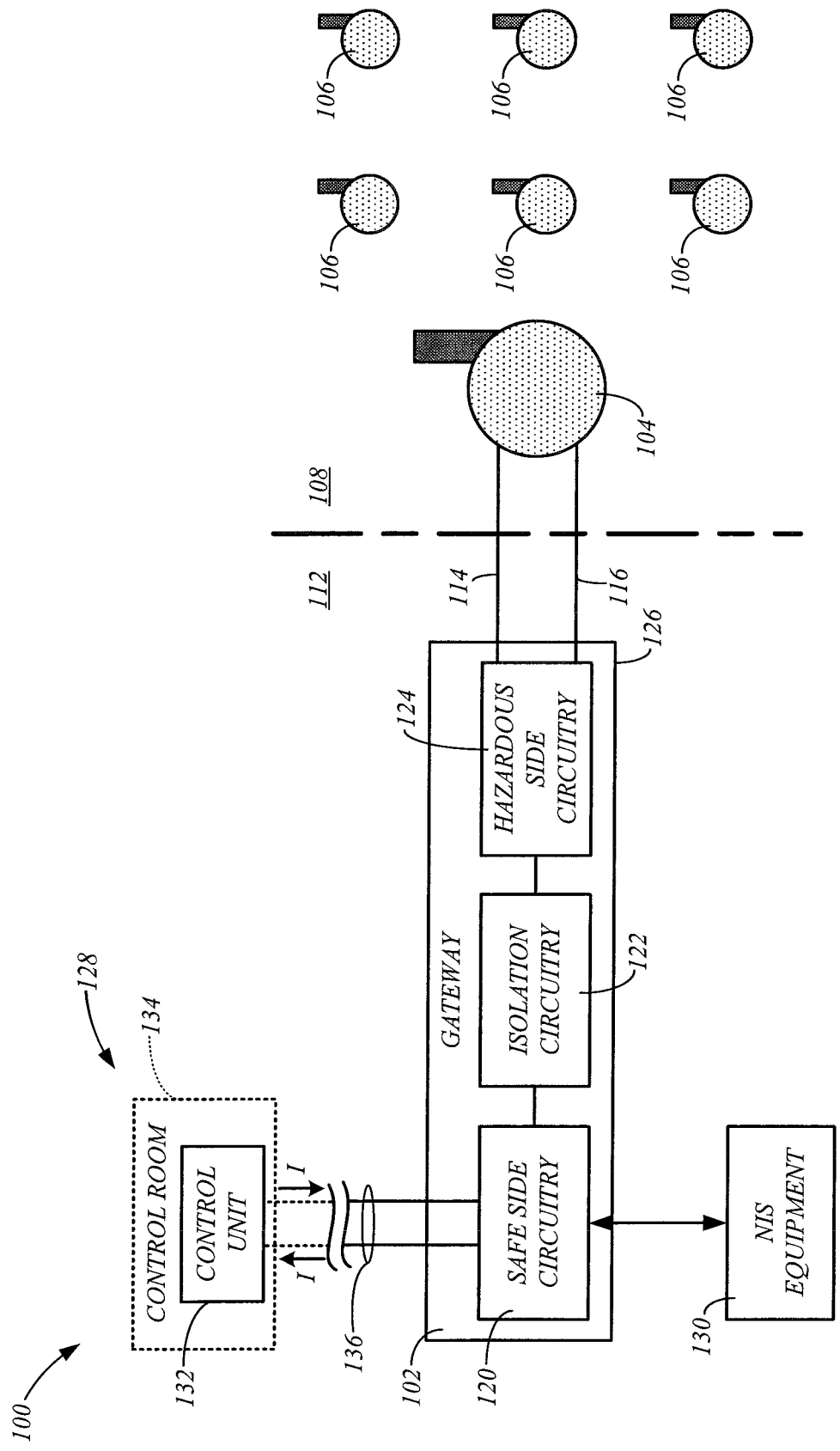
FIG. 1 is a simplified diagram of an industrial process sensor network including a wireless sensor network gateway, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

As used herein, the term "hazardous environment" refers to an environment that has been classified as hazardous (e.g., a Zone 0, Zone 1, Zone 2, Division 1 or Division 2 classified environment), in which electronic field devices must meet certain explosion protection safety standards, such as intrinsic safety standards. As used herein, the term "non-hazardous environment" or "safe environment" refer to an environment that has been classified as non-hazardous, in which electronic field devices are not required to meet explosion protection safety standards, or in a Zone 2 or Division 2 area where explosion protection requirements are not as onerous.

Figure 8:
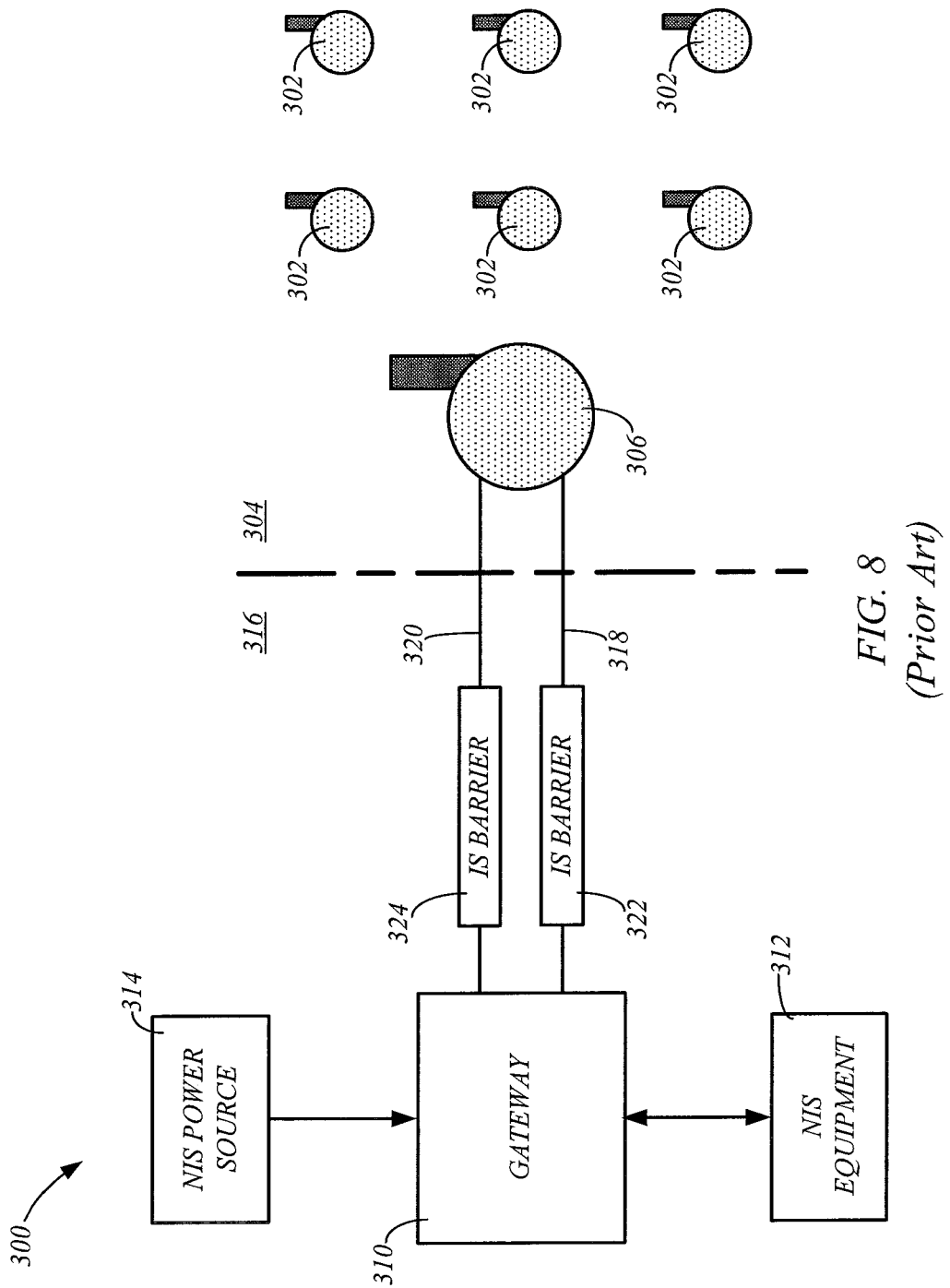
FIG. 8 is a simplified diagram of a wireless sensor network of an industrial process control system in accordance with the prior art.

FIG. 8 is a simplified diagram of a wireless sensor network 300 of an industrial process control system in accordance with the prior art. In the illustrated system, wireless process variable sensors 302 are installed in a hazardous environment 304, and are configured to wirelessly communicate data with an access point smart antenna 306. The antenna 306 is also typically located within the hazardous environment 304 and close to the sensors 302 to achieve the best network performance. As a result, both the sensors 302 and the antenna 306 must be configured as intrinsically safe devices for operation in the hazardous environment 304.

A wireless sensor network gateway 310 is used to power the antenna 306 and route data signals delivered from the antenna 306 to non-intrinsically safe (NIS) equipment 312. Due to the power required to run the gateway 310, which is supplied by a NIS power source 314, it is impractical to design the gateway 310 to meet intrinsic safety requirements for hazardous environments due to strict limits on electrical voltage, current and power. Accordingly, the gateway 310 must be located within a Zone 2 or Division 2 area where explosion protection requirements are not as onerous or in a non-hazardous environment 316.

Data signals may be communicated between the antenna 306 and the gateway 310 over a wired data connection 318, and power may be supplied to the antenna 306 from the gateway 310 over a wired power connection 320. To ensure that the antenna 306 satisfies intrinsic safety standards for the hazardous environment 304, intrinsic safety barriers 322 and 324 are provided along the connections 318 and 320 between the gateway 310 and the antenna 306 within the non-hazardous area 316.

The partitioned gateway 310 and intrinsic safety barriers 322 and 324 arrangement illustrated in FIG. 8 generally corresponds with conventional configurations for wireless sensor networks 300, such as those formed using the Emerson 1410D Gateway and the Emerson 781 Remote Link (smart antenna). However, one of the significant drawbacks of this partitioned approach is the requirement for the customer to purchase and install the appropriate intrinsic safety barriers 322 and 324 between the gateway 310 and the antenna 306. Such barriers 322 and 324 that are fit for a particular application can be difficult to find and are costly to purchase and install. Embodiments of the present disclosure provide a solution to these and other problems, and provide advantages over conventional wireless sensor network gateways 310.

FIG. 1 is a simplified diagram of an industrial process sensor network 100 having a wireless sensor network gateway 102, in accordance with embodiments of the present disclosure. The network 100 also includes one or more intrinsically safe access point smart antennas 104 (e.g., Emerson 781 Remote Link) and one or more wireless sensors 106, which are designed in accordance with intrinsic safety standards to allow them to be located within a hazardous environment 108. The sensors 106 may be configured to detect, measure or relay a process variable (e.g., pressure, temperature, level, etc.) of an industrial process. The sensors 106 wirelessly (e.g., RF signals) communicate data signals with the antenna 104.

The gateway 102, which is configured to be located within a Zone 2, Division 2 or non-hazardous environment 112, supplies power to the antenna 104 over a wired power connection 114, and communicates data with the antenna 104 over a wired data connection 116. The gateway 102 generally comprises safe side circuitry 120, isolation circuitry 122 and hazardous side circuitry 124. A housing 126 of the gateway 102 supports the circuitry 120, 122 and 124, and may enclose some or all of the circuitry 120, 122 and 124.

The safe side circuitry 120 is generally configured to connect with a non-intrinsically safe power source 128 and equipment 130, similar to the gateway 210 of FIG. 8. Thus, the safe side circuitry 120 may facilitate the communication of data signals between the antenna 104 and non-intrinsically safe equipment 130, and power the antenna 104 using power received from the non-intrinsically safe power source 128.

The hazardous side circuitry 124 is generally configured to provide the power to the circuitry of the antenna 104 over the wired power connection 114, and facilitate data communication with the antenna 104 over the wired data connection 116. The isolation circuitry 122 is configured to provide an intrinsic safety barrier between the hazardous side circuitry 124 and the safe side circuitry 120, such that the power and data connections 114 and 116, as well as the electrical signals delivered to the antenna 104 along the connections 114 and 116, meet intrinsic safety standards required by the antenna 104. In some embodiments, the connections 114 and 116 are provided in a single cable extending between the gateway 102 and the antenna 104.

In one embodiment, the gateway 102 may be connected to a computerized control unit 132, which may be located remotely from the gateway 102 in a control room 134, as shown in FIG. 1. The control unit 132 may be communicatively coupled to the gateway 102 over a suitable physical communication link, such as a two-wire control loop 136, or a wireless communication link. Thus, the control room 134 may operate as non-intrinsically safe equipment 130 that communicates data signals to and from the antenna 104 through the gateway 102.

Communications between the control unit 132 and the gateway 102 may be performed over the control loop 136 in accordance with conventional analog and/or digital communication protocols. In some embodiments, the control loop 136 includes a two-wire, 4-20 milliamp control loop, in which a process variable or other value detected by one of the sensors 106, and communicated by the antenna 104 to the gateway 102, may be represented by a level of a loop current I flowing through the control loop 136. Exemplary digital communication protocols include the modulation of digital signals onto the analog current level of the two-wire control loop 136, such as in accordance with the HART® communication standard. Other purely digital techniques may also be employed including FieldBus and Profibus communication protocols.

The gateway 102 may be powered by any suitable power source 128, such as an A. C. power main, power over ethernet, a battery, an electrical generator (solar panel, a wind power generator, etc.), or another power source. In one embodiment, the control room 132 may form the power source 128 by supplying the gateway 102 with power using the current I flowing through the control loop 136, as indicated in FIG. 1.

Figure 2:
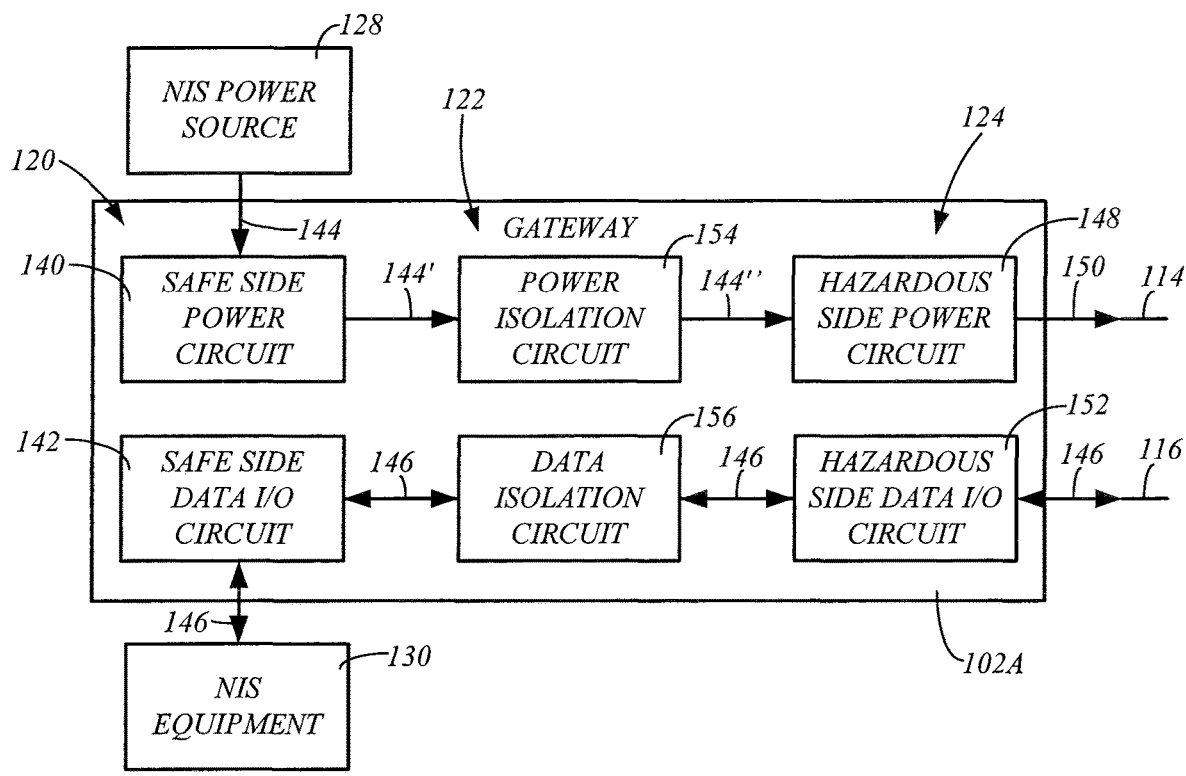
FIG. 2 is a simplified diagram of an example gateway, in accordance with embodiments of the present disclosure.

FIG. 2 is a simplified diagram of an example gateway 102A, in accordance with embodiments of the present disclosure. In one embodiment, the safe side circuitry 120 of the gateway 102A includes a safe side power circuit 140 and a safe side data input/output (I/O) circuit 142. The power circuit 140 operates to receive power 144 from the NIS power source 128, and the data I/O circuit 142 operates to communicate data signals 146 with the NIS equipment 130, which could include the control unit 132 (FIG. 1) and/or other equipment.

In one embodiment, the hazardous side circuitry 124 of the gateway 102A includes a hazardous side power circuit 148 that supplies power 150 to the antenna 104 over the power connection 114. In some embodiments, the hazardous side power circuit 148 processes the power 150 (e.g., adjusts or limits the power, a voltage, and/or a current) before discharging it over the power connection 114.

The hazardous side circuitry 124 of the gateway 102A may also include a hazardous side data I/O circuit 152 that facilitates the communication of the data signals 146 between the antenna 104 and the gateway 102A over the data connection 116. The hazardous side data I/O circuit 152 and/or the safe side data I/O circuit 142 may be configured to implement a data communication standard, such as RS-485, Foundation Fieldbus, Fieldbus Intrinsically Safe Concept, and IEEE 802.3cg/APL/2-WISE, for example, when communicating the data signals 146 with the antenna 104 and/or the equipment 130.

The isolation circuitry 122 of the gateway 102A includes a power isolation circuit 154 that couples the safe side power circuit 140 to the hazardous side power circuit 148, and forms an intrinsic safety barrier between the safe side power circuit 140 and the hazardous side power circuit 148. The intrinsic safety barrier of the power isolation circuit 154 may block electrical power from directly traveling between the safe side power circuit 140 and the hazardous side power circuit 148, and/or translate a non-intrinsically safe input power 144' received from the safe side power circuit 140 to an intrinsically safe power 144". The hazardous side power circuit 148 optionally processes the intrinsically safe power 144" output from the power isolation circuit before delivering the power 150 to the antenna 104 along the power connection 114.

The isolation circuitry 122 of the gateway 102A also includes a data isolation circuit 156 that couples the safe side data I/O circuit 142 to the hazardous side data I/O circuit 152, and forms an intrinsic safety barrier between the safe side data I/O circuit 142 and the hazardous side data I/O circuit 152. In some embodiments, the intrinsic safety barrier of the data isolation circuit 156 creates a barrier that blocks electrical signals from directly traveling between the safe side data I/O circuit 142 and the hazardous side data I/O circuit 152. This isolation prevents a current or voltage spike at the safe side data I/O circuit 142 from reaching the hazardous side data I/O circuit 152 and the antenna 104.

Figure 3:
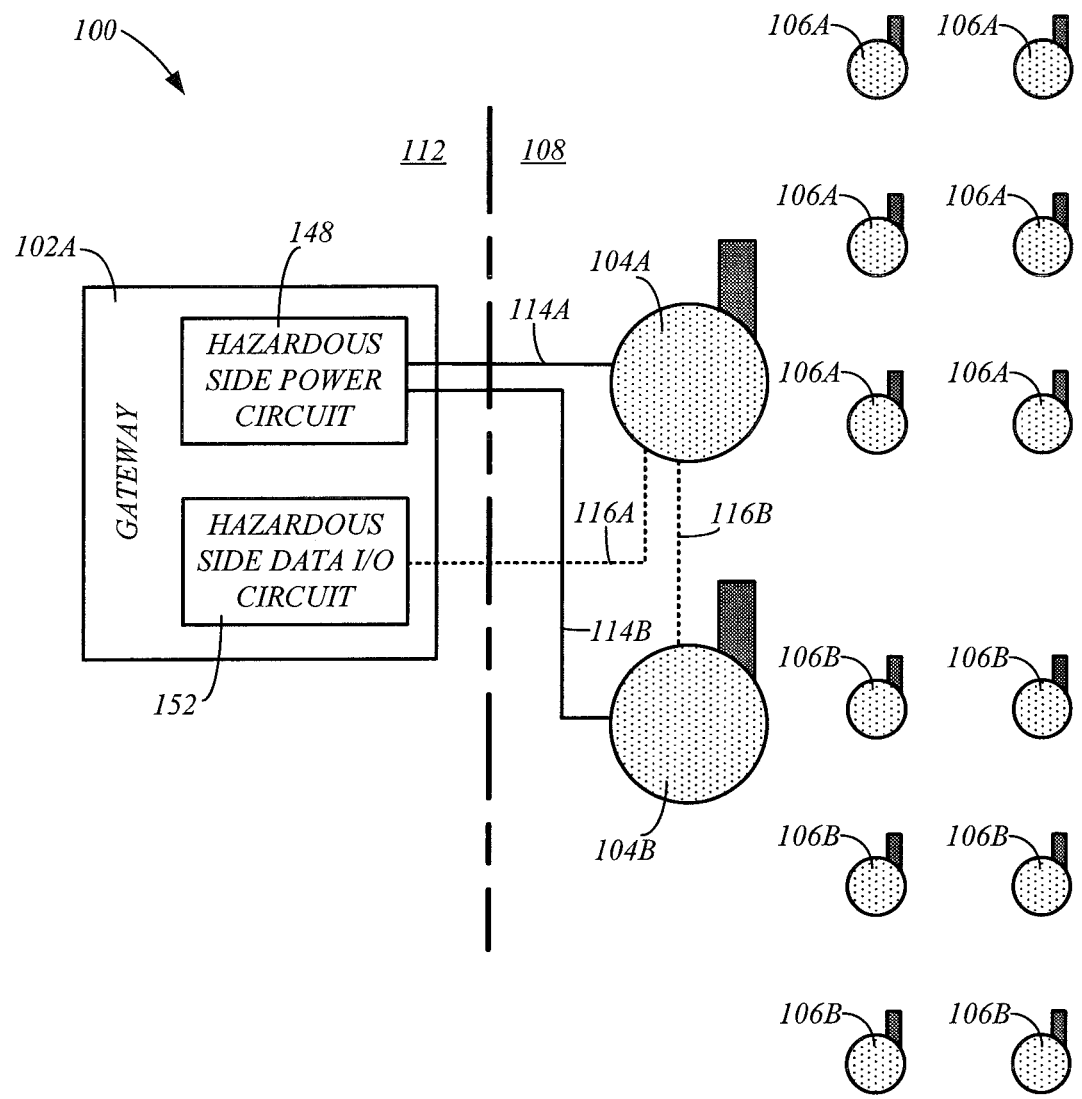
FIG. 3 is a simplified diagram illustrating power connections and data connections for connecting the gateway of FIG. 2 to multiple antennas, in accordance with embodiments of the present disclosure.

In some embodiments, the gateway 102A is configured to power and communicate with multiple access point smart antennas 104. FIG. 3 is a simplified diagram illustrating power connections 114 and data connections 116 for connecting the gateway 102A to multiple antennas 104, such as antennas 104A and 104B, which respectively communicate with corresponding sensors 106A and 106B. Only the hazardous side power circuit 148 and the hazardous side data I/O circuit 152 of the gateway 102 are shown to simplify the illustration.

In one embodiment, separate power connections 114A and 114B may be used to supply power to the antennas 104 from the single power channel formed by the safe side power circuit 140, the power isolation circuit 154, and the hazardous side power circuit 148. Alternatively, separate isolated power channels may be provided for each of the antennas 104 of the network 100.

Data communications between the single data channel formed by the safe side data I/O circuit 142, the data isolation circuit 156, and the hazardous side data I/O circuit 152 of the gateway 102A, and each of the multiple antennas 104A and 104B, may be facilitated by a data connection 116 in the form of a common data communication bus extending from the hazardous side data I/O circuit to each of the antennas 104A and 104B, as shown in FIG. 3. The gateway 102A may provide data communication with additional antennas 104 in a similar manner. Thus, data communication protocols such as Foundation Fieldbus, Profibus, and FISCO may be implemented using separate drops from the bus 116 to each of the multiple antennas 104. The IEEE 802.3cg/APL/2-WISE communication protocol may be implemented by including an APL field switch in the single data channel, such as in the hazardous side data I/O circuit 152, for the multiple access point smart antennas 104.

Figure 4:
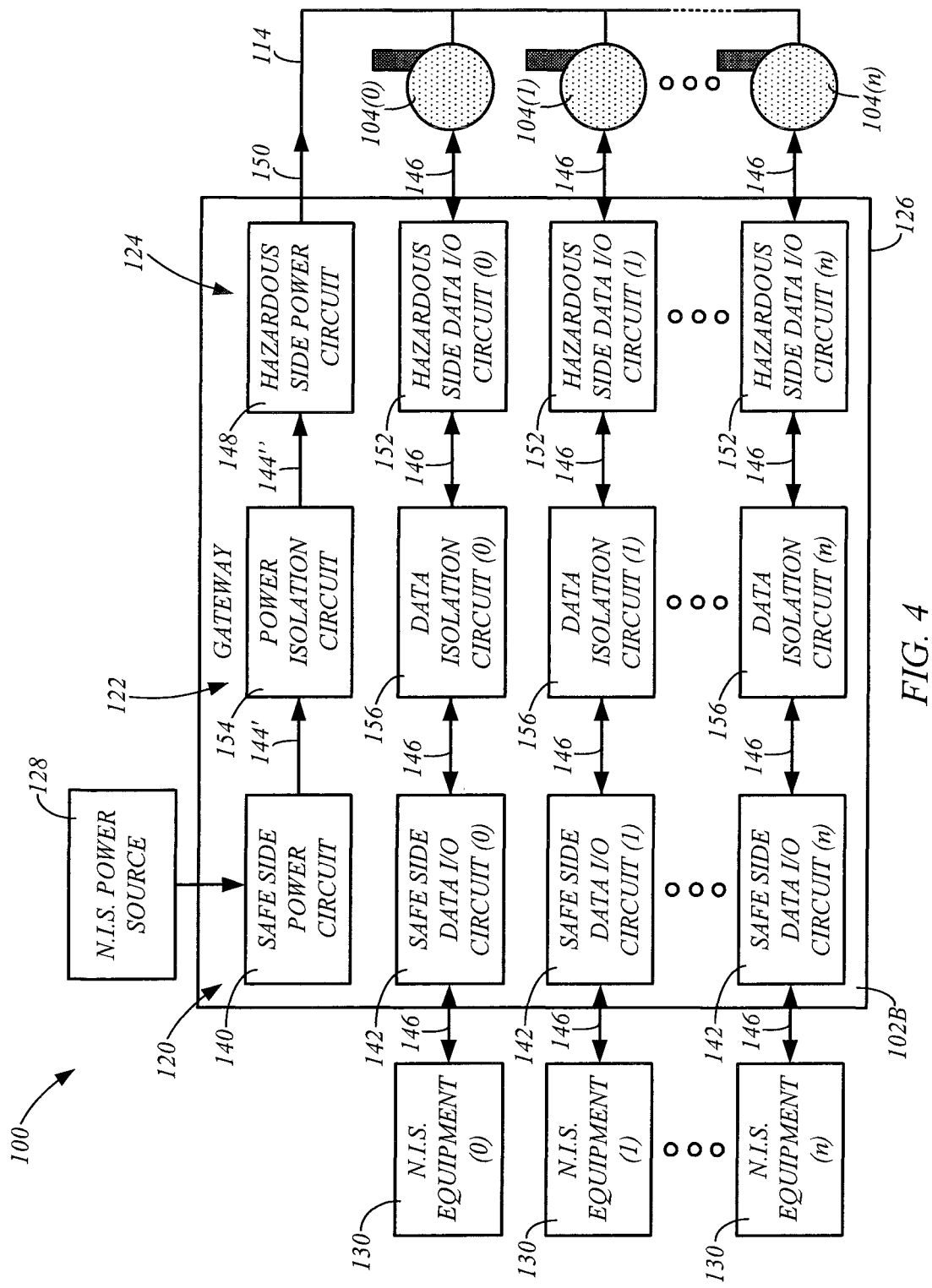
FIG. 4 is a simplified diagram of an example of a wireless sensor network that includes an example gateway, in accordance with embodiments of the present disclosure.

FIG. 4 is a simplified diagram of an example of a wireless sensor network 100 that includes an example gateway 102B, in accordance with embodiments of the present disclosure. The primary distinction between the gateway 102B and the gateway 102A (FIG. 2) is the inclusion of multiple data communication channels (e.g., 0-n), each formed by a connected set of the safe side data I/O circuit 142, the data isolation circuit 156, and the hazardous side data I/O circuit 142. Each of the data communication channels is configured to communicate data between corresponding equipment 130 (0-n) and a corresponding antenna 104 (0-n). Each of the data communication channels may operate in the manner described above with regard to the single data communication channel of the gateway 102A (FIG. 2) formed by the safe side data I/O circuit 142, the data isolation circuit 156, and the hazardous side data I/O circuit 152.

Figure 5:
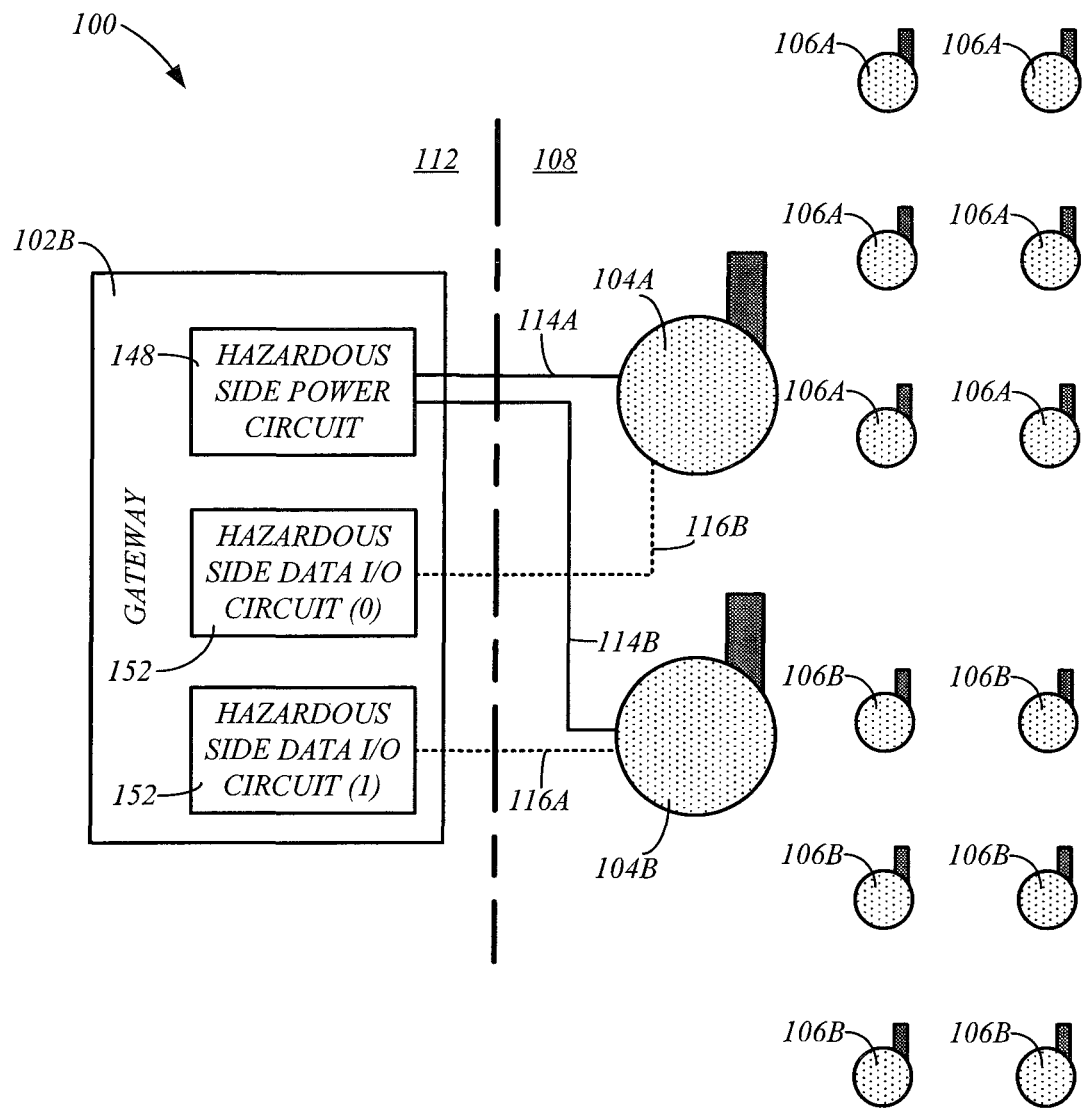
FIG. 5 is a simplified diagram illustrating power connections and data connections for connecting the gateway of FIG. 4 to multiple antennas, in accordance with embodiments of the present disclosure.

FIG. 5 is a simplified diagram illustrating power connections 114 and data connections 116 for connecting the gateway 102B to multiple antennas 104, such as antennas 104A and 104B, which respectively communicate with corresponding sensors 106A and 106B. Only the hazardous side power circuit 148 and two of the hazardous side data I/O circuits 152 of the gateway 102B are shown to simplify the illustration.

In one example, separate power connections 114A and 114B may be used to supply power 150 to the multiple antennas 104A and 104B from the hazardous side power circuit 148. Power may be supplied to additional antennas 104 in a similar manner.

Data communications between each of the hazardous side data I/O circuits 152 of the gateway 102B and the multiple antennas 104A and 104B, may be facilitated by separate data connections 116A and 116B, which are each connected to one of the data communication channels of the gateway 102B. The gateway 102B may provide data communication with additional antennas 104 in a similar manner.

Figure 6:
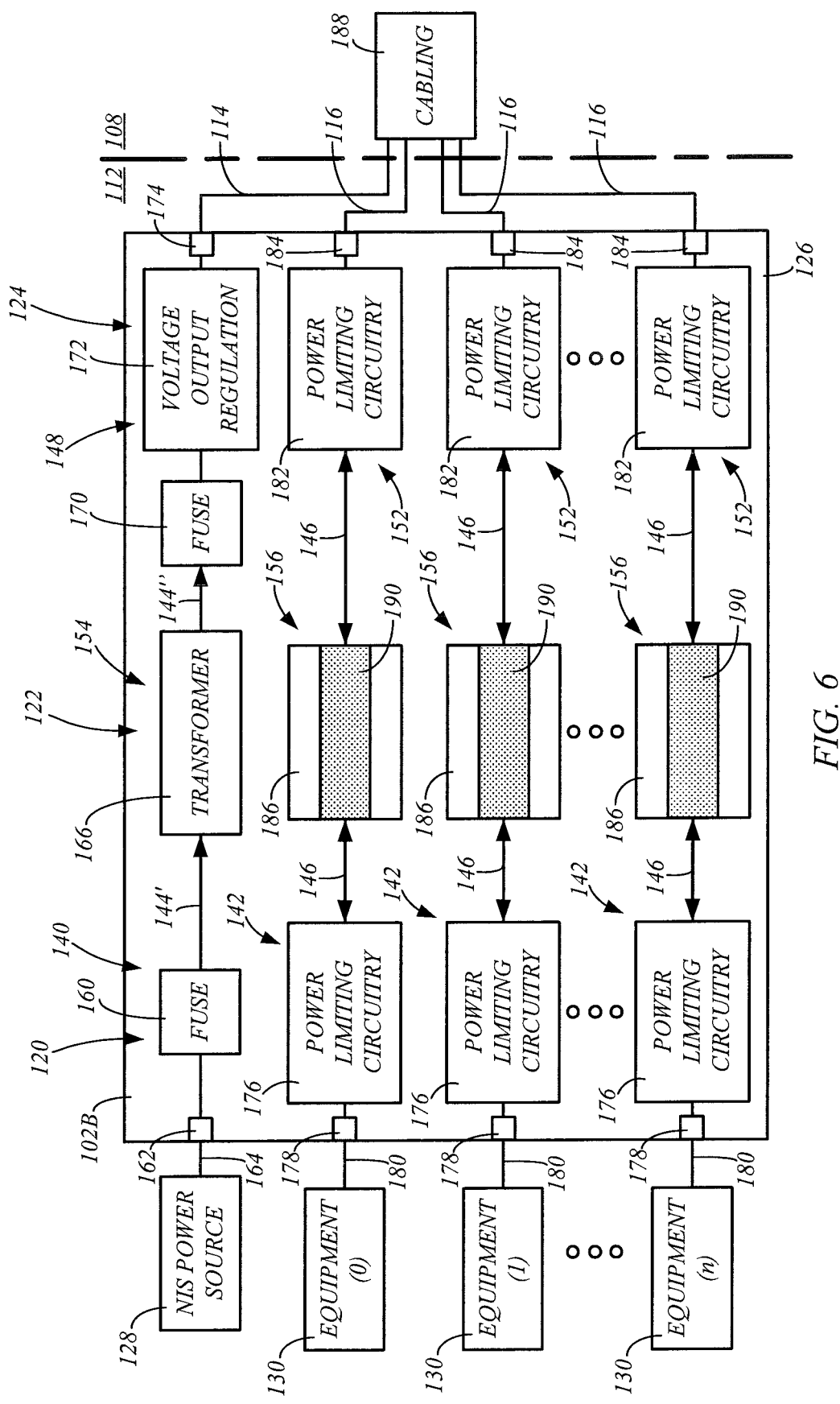
FIG. 6 is a simplified drawing of the gateway of FIG. 4, in accordance with embodiments of the present disclosure.

FIG. 6 is a simplified drawing of the gateway 102B, in accordance with embodiments of the present disclosure. The features illustrated in FIG. 6 may be applied to the gateway 102A where applicable.

In one embodiment, the safe side power circuit 140 includes a fuse 160 that is configured to open the circuit in the event of a power surge. The safe side power circuit 140 may include one or more connectors 162 for connecting the safe side power circuit 140 to one or more cables 164, which may be connected to the NIS power source 128.

One embodiment of the power isolation circuit 154 includes a transformer 166 that blocks the direct passage of the electrical power 144' from the safe side power circuit 140 to the hazardous side power circuit 148. The transformer 166 receives the power 144' from the power source 128 on an input side and transfers the power 144" to the output side. In some embodiments, the transformer 166 is a step-down transformer that discharges the power 144" at a lower voltage on the output side than the voltage of the power 144' received at the input side.

The hazardous side power circuit 148 may include a fuse 170 configured to open the circuit in the event of a power surge, and/or voltage output regulation circuitry 172. The voltage output regulation circuitry 172 may operate to regulate a volage the power 144" to form the power 150 that satisfies the intrinsic safety power requirements of the one or more antennas 104 receiving the power 150. The voltage output regulation circuitry 172 may take on various forms and may include power limiting components, such as Zener diodes and resistors. The hazardous side power circuit 148 may also include connectors 174 for connecting one or more cables forming the one or more power connections 114.

Each of the one or more safe side data I/O circuits 142 of the gateway 102B may include power limiting circuitry 176 that is configured to limit the current and/or voltage of the data signals 146 communicated between the corresponding NIS equipment 130 and the data isolation circuit 156. The power limiting circuitry 176 may take on various forms and may include current, voltage and/or power limiting components (e.g., resistors, fuses, Zener diodes, etc.). In some embodiments, the safe side data I/O circuits 142 include connectors 178 for connecting the safe side data circuit 142 to one or more cables 180, which may be connected to NIS equipment 130.

Each of the one or more hazardous side data I/O circuits 152 of the gateway 102B may include power limiting circuitry 182 that is configured to limit the current and/or voltage of the data signals 146 communicated between the data isolation circuit 156 and the corresponding antenna 104. The power limiting circuitry 182 may be formed in a similar manner as the power limiting circuitry 176 described above and include current, voltage and/or power limiting components (e.g., resistors, fuses, Zener diodes, etc.). In some embodiments, the hazardous side data I/O circuits 152 include connectors 184 for connecting to one or more cables forming the data connections 116.

Each of the one or more data isolation circuits 156 of the gateway 102B may include a galvanic data isolation circuit 186 that provides full galvanic isolation to the hazardous side data I/O circuit 152 and the corresponding antenna 104. This allows the wiring forming the data connections 116 to be simplified and resilient to transients and ground potential differences. Additionally, the data isolation circuits 156 and the hazardous side data I/O circuits 152 may be configured to tolerate inadvertent data connection wiring disconnection, interconnection and grounding thereby allowing the wiring of the data connections 116 to be commingled in standard low cost cabling 188. This reduces the installed cost and complexity of the wiring.

In one embodiment, the galvanic data isolation circuit 186 comprises a suitable optical coupler 190 that prevents electrical signals from directly traveling between the safe side data I/O circuit 142 and the hazardous side data I/O circuit 152. The optical coupler 190 generally translates the data signals 146 received from the hazardous side data I/O circuit 152 into light signals, transmits the light signals through an optical path, translates the light signals into electrical data signals, and outputs the electrical data signals 146 to the safe side data I/O circuit 142. Likewise, the optical coupler 190 may also be configured to translate data signals 146 received from the safe side data I/O circuit 142 into light signals, transmit the light signals through an optical path, translate the light signals into electrical data signals, and output the electrical data signals 146 to the hazardous side data I/O circuit 152.

Thus, the gateway 102 formed in accordance with one or more of the embodiments described above incorporates isolation circuitry 122 that renders the power connections 114 and the data connections 116, as well as the electrical signals communicated over the connections, intrinsically safe for the terminals of the one or more antennas located in the hazardous environment 108. Thus, the gateway 102 does not require additional external intrinsic safety barriers of conventional gateways 310, such as barriers 322 and 324 shown in FIG. 8.

The intrinsic safety requirements that may be required for a given wireless sensor network may depend on the particular type of hazardous environment in which the one or more smart antennas may be located. Additionally, intrinsic safety standards for a given hazardous environment may be different for different countries, and may also change over time. As a result, it nay be necessary to customize circuitry of the gateway 102 depending on its application. Furthermore, it may be necessary to periodically update the circuitry of an installed gateway 102 to meet new intrinsic safety standards, or to repair malfunctioning circuitry of the gateway 102.

Figure 7:
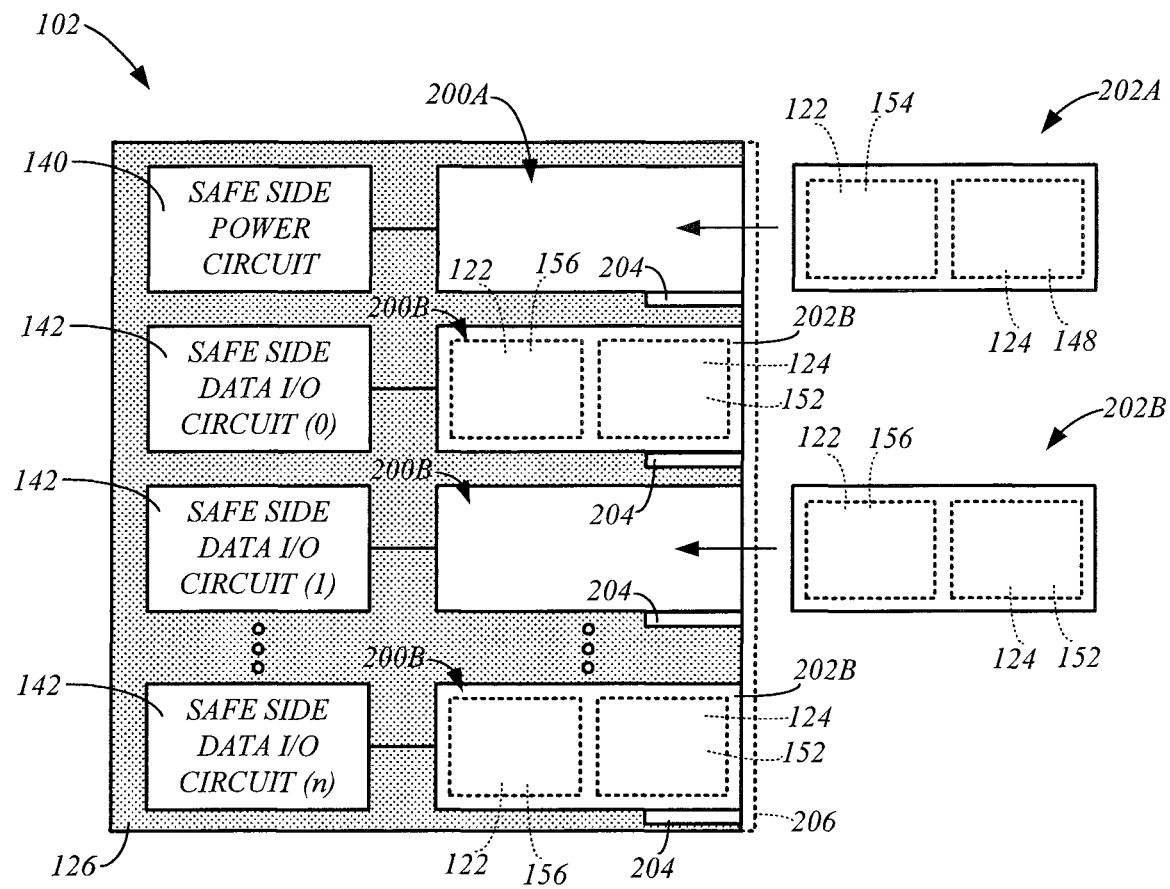
FIG. 7 is a simplified illustration of an example of a wireless sensor network gateway, in accordance with embodiments of the present disclosure.

FIG. 7 is a simplified illustration of an example of a wireless sensor network gateway 102 that is configured to simplify customizing and updating of circuitry of the gateway 102, such as the isolation circuitry 122 and/or the hazardous side circuitry 124. In one embodiment, the housing 126 of the gateway 102 includes one or more module receivers, generally referred to as 200, each of which is configured to receive a corresponding module 202. In one embodiment, each module 202 includes at least a portion of the isolation circuitry 122 and/or at least a portion of the hazardous side circuitry 124. The modules may be inserted into corresponding module receivers to connect the portions of the isolation circuitry 122 and/or the portions of the hazardous side circuitry 124 to the corresponding safe side circuitry 120 to form an operating gateway 102. Connectors 204, such as tab and detest connectors or other suitable connectors, operate to secure each of the modules 202 within its module receiver 200. As a result, a gateway 102 may be easily customized for a given application by inserting the modules 202 required by the particular application for the gateway, or maintained (updated, repaired, etc.) by replacing one or more existing modules 202 of the gateway that, for example, do not meet current intrinsic safety standards or are malfunctioning, with new modules 202.

In one example, the gateway 102 includes one or more power modules 202A that include a portion or the entirety of the power isolation circuit 154 and/or a portion or the entirety of the hazardous side power circuit 148, and the housing 126 includes a power module receiver 200A that is configured to receive the power module 202A, as indicated in FIG. 7. Thus, embodiments of the power module 202A include all or a portion of the power isolation circuit 154, and/or all or a portion of the hazardous side power circuit 148. Remaining circuitry of the power isolation circuit 154 and/or hazardous side power circuit 148 may remain supported by the housing 126 when the power module 202A is removed from the receiver 200A. When the power module 202A is fully received within the receiver 200A an electrical connection is formed between the safe side power circuit 140 and the power isolation circuit 154 and the hazardous side power circuit 148. Additional power modules 202A and corresponding receivers 200A may be implemented in the gateway 102 to provide multiple power supplies.

The gateway 102 may also include one or more data modules 202B, each of which includes at least a portion of the data isolation circuit 156 and/or a portion of the hazardous side data circuit 152, and the housing 126 includes one or more data module receivers 200B, each of which is configured to receive one of the data modules 202B, as indicated in FIG. 7. Thus, embodiments of the data modules 202B include all or a portion of the data isolation circuit 156, and/or all or a portion of the hazardous side data circuit 152. Remaining circuitry of the data isolation circuit 156 and/or hazardous side data circuit 152 may remain supported by the housing 126 when the data module 202B is removed from the receiver 200B. When the data module 202B is fully received within the receiver 200B, an electrical connection is formed between the safe side data circuit 142 and the data isolation circuit 156 and the hazardous side data I/O circuit 152.

In some embodiments, the shape of the module receivers 200 are keyed to corresponding modules 202 to prevent a user from inserting a data module 202B into a power module receiver 200A, or a power module 202A into a data module receiver 200B. For example, an exterior shape of the modules 202 and the socket of the module receivers 200 may include features, such as tabs and grooves, that only allow the modules 202 to be inserted into the intended module receivers 200.

In some embodiments, the gateway 102 may include filler modules that do not include circuitry, and are used to block open module receivers 200.

The housing may include a cover 206 for the module receivers 200, which is illustrated in phantom lines. The cover 206 may be removed to install the modules 202 within the module receivers 200, then installed to protect the modules 202 and the circuitry of the gateway 102 from environmental conditions.

Although the embodiments of the present disclosure have been described with reference to preferred embodiments, workers skilled in the art will recognize that changes may be made in form and detail without departing from the spirit and scope of the present disclosure.

What is claimed is:

1. A wireless sensor network gateway for an industrial process used to monitor or control process variables of the industrial process, the wireless sensor network gateway configured to be located in a non-hazardous environment, and to supply power and communicate data with an antenna of a wireless sensor network located in a hazardous environment, the wireless sensor network gateway comprising:
   safe side circuitry comprising:
      a safe side power circuit configured to receive power from a non-intrinsically safe power source; and
      a safe side data input/output (I/O) circuit configured to communicate process variable data related to process variables of the industrial process with non-intrinsically safe equipment including an industrial process controller located remotely from the wireless sensor network gateway;
   hazardous side circuitry comprising:
      a hazardous side power circuit configured to deliver power to the antenna; and
      a hazardous side data I/O circuit configured to pass data signals related to the process variable data to and from the antenna to communicate the process variable data with a wireless field device of the type used to sense or control an industrial process variable, the wireless field device located remotely from the wireless sensor network gateway;
   isolation circuitry dividing the safe side circuitry from the hazardous side circuitry comprising:
      a power isolation circuit coupling the safe side power circuit to the hazardous side power circuit, and forming an intrinsic safety barrier between the safe side power circuit and the hazardous side power circuit; and
      a data isolation circuit coupling the safe side data I/O circuit to the hazardous side data I/O circuit, and forming an intrinsic safety barrier between the safe side data I/O circuit and the hazardous side data I/O circuit; and
      a housing supporting the safe side circuitry, the hazardous side circuitry, and the isolation circuitry.

2. The wireless sensor network gateway of claim 1, wherein the power isolation circuit comprises a transformer.

3. The wireless sensor network gateway of claim 2, wherein the data isolation circuit comprises a galvanic isolation circuit.

4. The wireless sensor network gateway of claim 3, wherein the galvanic isolation circuit comprises an optical coupler.

5. The wireless sensor network gateway of claim 3, wherein the hazardous side power circuit comprises a voltage output regulation circuit configured to regulate a voltage of the power delivered to the antenna.

6. The wireless sensor network gateway of claim 5, wherein the safe side power circuit comprises a fuse.

7. The wireless sensor network gateway of claim 3, wherein the data isolation circuit is configured to block electrical signals from directly traveling between the safe side data I/O circuit and the hazardous side data I/O circuit.

8. The wireless sensor network gateway of claim 3, wherein the safe side data I/O circuit and/or the hazardous side data I/O circuit are configured to implement a data communication standard selected from the group consisting of RS-485, Foundation Fieldbus, Fieldbus Intrinsically Safe Concept, and IEEE 802.3cg/APL/2-WISE.

9. The wireless sensor network gateway of claim 1, wherein:
the housing comprises a module receiver; and
the gateway comprises:
a module that is removably receivable within the module receiver, the module including at least a portion of the isolation circuitry and/or at least a portion of hazardous side circuitry; and
a cooperating connector configured to secure the module within the module receiver,
wherein an electrical connection is formed between the safe side circuitry and the portion of the hazardous side circuitry and/or the portion of the isolation circuitry when the module is received within the module receiver.

10. The wireless sensor network gateway of claim 9, wherein the module comprises one of:
at least a portion of the power isolation circuit and/or at least a portion of the hazardous side power circuit; and
at least a portion of the data isolation circuit and/or at least a portion of the hazardous side data I/O circuit.

11. A wireless sensor network gateway for an industrial process used to monitor or control process variables of the industrial process, the wireless sensor network gateway configured to be located in a non-hazardous environment, and to supply power and communicate data with a plurality of antennas of a wireless sensor network located in a hazardous environment, the wireless sensor network gateway comprising:
safe side circuitry comprising:
a safe side power circuit configured to receive power from a non-intrinsically safe power source; and
a plurality of safe side data input/output (I/O) circuits, each configured to communicate process variable related to process variables of the industrial process data with non-intrinsically safe equipment including an industrial process controller located remotely from the wireless sensor network gateway;
hazardous side circuitry comprising:
a hazardous side power circuit configured to deliver power to the plurality of antennas; and
a plurality of hazardous side data I/O circuits, each configured to pass data signals related to the process variable data to and from one of the plurality of antennas to communicate the process variable data with wireless field devices of the type used to sense or control an industrial process variable the wireless field devices located remotely from the wireless sensor network gateway;
isolation circuitry dividing the safe side circuitry from the hazardous side circuitry comprising:
a power isolation circuit coupling the safe side power circuit to the hazardous side power circuit, and forming an intrinsic safety barrier between the safe side power circuit and the hazardous side power circuit; and
a plurality of data isolation circuits, each coupling one of the plurality of safe side data I/O circuits to a corresponding one of the plurality of hazardous side data I/O circuits, and forming an intrinsic safety barrier between the plurality of safe side data I/O circuits and the corresponding plurality of hazardous side data I/O circuits; and
a housing supporting the safe side circuitry, the hazardous side circuitry, and the isolation circuitry.

12. The wireless sensor network gateway of claim 11, wherein the power isolation circuit comprises a transformer.

13. The wireless sensor network gateway of claim 12, wherein each of the data isolation circuits comprises at least one galvanic isolation circuit.

14. The wireless sensor network gateway of claim 13, wherein the galvanic isolation circuit comprises an optical coupler.

15. The wireless sensor network gateway of claim 13, wherein the hazardous side power circuit comprises a voltage output regulation circuit configured to regulate a voltage of the power delivered to the antennas.

16. The wireless sensor network gateway of claim 15, wherein the safe side power circuit comprises a fuse.

17. The wireless sensor network gateway of claim 13, wherein each of the data isolation circuits is configured to block electrical signals from directly traveling between the connected safe side data I/O circuit and the hazardous side data I/O circuit.

18. The wireless sensor network gateway of claim 13, wherein each of the safe side data I/O circuit and/or each of the hazardous side data I/O circuit are configured to implement a data communication standard selected from the group consisting of RS-485, Foundation Fieldbus, Fieldbus Intrinsically Safe Concept, and IEEE 802.3cg/APL/2-WISE.

19. The wireless sensor network gateway of claim 11, wherein:
the housing comprises a module receiver; and
the gateway comprises:
a module that is removably receivable within the module receiver, the module including at least a portion of the isolation circuitry and/or at least a portion of the hazardous side circuitry; and
a cooperating connector configured to secure the module within the module receiver,
wherein an electrical connection is formed between the safe side circuitry and the portion of the hazardous side circuitry and/or the portion of the isolation circuitry when the module is received within the module receiver.

20. The wireless sensor network gateway of claim 19, wherein the module comprises one of:
at least a portion of the power isolation circuit and/or at least a portion of the hazardous side power circuit; and
at least a portion of the data isolation circuit and/or at least a portion of the hazardous side data I/O circuit.

* * * * *